United States Patent
McCain et al.

(10) Patent No.: US 7,040,746 B2
(45) Date of Patent: May 9, 2006

(54) INKJET INK HAVING YELLOW DYE MIXTURE

(75) Inventors: Sandra Helton McCain, Lexington, KY (US); John Mark Medley, Lexington, KY (US); Agnes Kam Zimmer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 66 days.

(21) Appl. No.: 10/697,231

(22) Filed: Oct. 30, 2003

(65) Prior Publication Data

US 2005/0093950 A1    May 5, 2005

(51) Int. Cl.
  *G01D 11/00*    (2006.01)
(52) U.S. Cl. ............... 347/100; 347/95; 106/31.27
(58) Field of Classification Search .......... 347/100, 347/96, 95, 101, 105; 106/31.27, 31.13, 106/31.6; 523/160; 101/31.6, 31.27, 31.13
See application file for complete search history.

(56) References Cited

U.S. PATENT DOCUMENTS

| | | | |
|---|---|---|---|
| 4,601,756 A | | 7/1986 | Chiba et al. |
| 5,108,504 A | | 4/1992 | Johnson et al. |
| 5,560,766 A | * | 10/1996 | Gundlach .................. 347/100 |
| 5,772,742 A | | 6/1998 | Wang |
| 5,776,230 A | * | 7/1998 | Gundlach et al. ......... 106/31.27 |
| 5,788,750 A | * | 8/1998 | Gundlach et al. ........... 347/100 |
| 6,320,031 B1 | * | 11/2001 | Baettig et al. ............. 534/803 |
| 6,540,821 B1 | | 4/2003 | Adamic et al. |

* cited by examiner

Primary Examiner—Manish S. Shah
(74) Attorney, Agent, or Firm—John A. Brady

(57) ABSTRACT

An inkjet ink of exceptional overall color characteristics having about 4% by weight Direct Yellow 132 in acid form, about 1% by weight Acid Yellow 17 in acid form in water, also having a humectant, a penetrant and other generally known additives. The ink having chroma of at least about 108.5.

4 Claims, 1 Drawing Sheet

INKJET INK HAVING YELLOW DYE MIXTURE

TECHNICAL FIELD

This invention relates to aqueous yellow inkjet inks having improved properties particularly with respect to chroma, permanence and printing performance.

BACKGROUND OF INVENTION

Recently, inkjet printers have become increasingly important in numerous applications. While generation of text print documents has remained important, inkjet printers have become increasingly important in generation of photographs created through digital means. The speed and quality with which prints are generated has also become increasingly important as customers continue to raise their expectations. This transformation presented significant difficulties in the formulation of inkjet inks. Unlike previous application, photographs require long term archivability. Instead of lasting for a few weeks or months, photographs are expected to remain unchanged for years or even decades. With increased print speeds and customer expectations, the performance of the ink during printing has become even more critical.

With previous inkjet dye sets, the required degree of permanence has not been readily attained without a negative impact on color. In order to address this issue, new dyes are being employed in the inkjet industry. In order to be successful at attaining the required level of archivability, a careful balance of color and permanence must be obtained for the combination of dyes employed in the ink set.

Another essential quality of inkjet ink that must be addressed is its consistent performance in a printhead. This includes such attributes as start-up, maintenance, and reliability. Since the ink consists primarily of an aqueous medium with additional cosolvents, the compatibility of the dyes employed in the ink with the balance of the ink is paramount importance. Many dyes exhibit excellent color or lightfastness, but are deficient in this required compatibility, which can often be expressed in terms of the aqueous solubility of the dye.

In order to address these divergent requirements, blending of dyes is often required. This invention describes combinations of yellow dyes that sufficiently address these three issues. The resulting inks exhibit excellent permanence, brilliant color, and robust performance in the printhead.

This invention employs two dyes in specific amounts to achieve exceptional results.

DISCLOSURE OF THE INVENTION

This invention employs in an aqueous ink about 4% by weight Direct Yellow 132 in acid form and between about 0.5% to 1 percent by weight Acid Yellow 17 in acid form.

The aqueous ink may otherwise be a conventional inkjet ink.

An otherwise conventional ink would contain this dye mixture and, typically, a humectant (cosolvent) such as 2-pyrollidone or glycols or their mixture, a penetrant such as a 1,2-alkyldiol, and biocide. Such an ink with the foregoing dye mixture exhibits exceptionally good chroma and lightfastness and a high optical density while performing very well as an inkjet ink.

DESCRIPTION OF THE INVENTION

Figure 1:
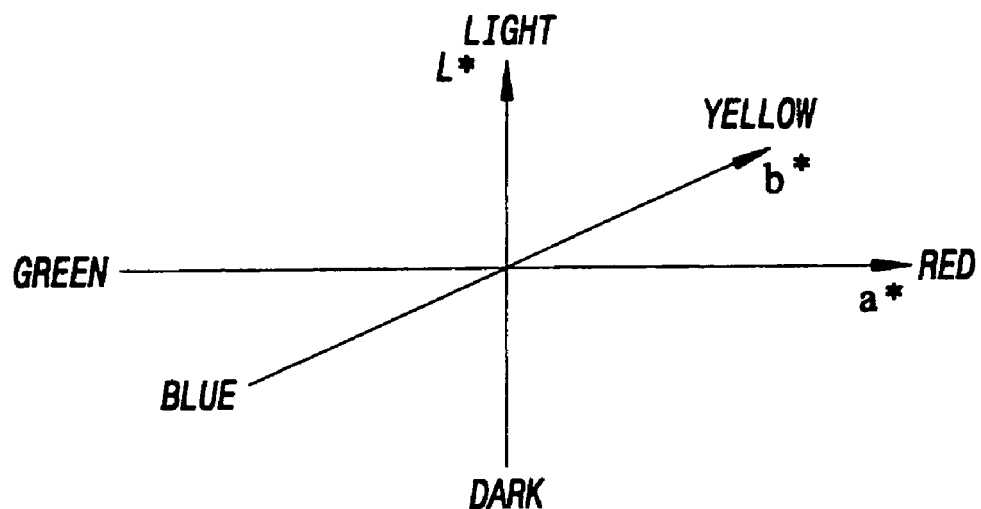
Figure 2:
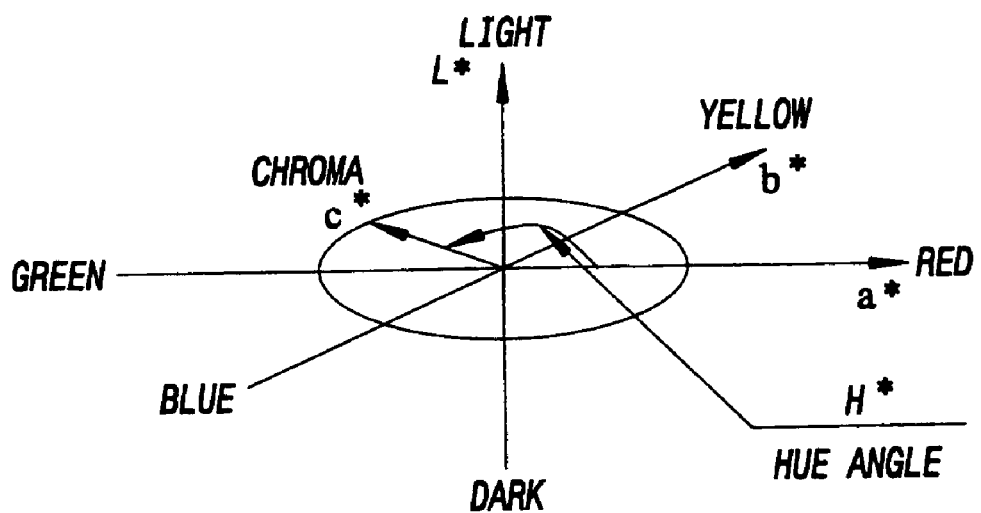

The details of this invention will be described in connection with the accompanying drawings, in which FIG. 1 illustrates the CIELAB color space in a Cartesian coordinate system; and FIG. 2 illustrates the CIELAB color space in a vector coordinate system.

DESCRIPTION OF THE PREFERRED EMBODIMENTS

This invention will be described by use of the well-established CIELAB Color System Space.

CIELAB Color System-Space: The CIELAB color system was established by the Commission Internationale de l'Eclairage (CIE) in 1976. It is color space to be used for the specification of color differences. It consists of L* three variables as Cartesian coordinates to form a three-dimensional color space as shown in FIG. 1. The L* is a correlate to perceived lightness ranging from 0.0 for black to 100.0 for a diffuse white. The a* and b* dimensions correlate approximately with red-green and yellow-blue chroma perceptions. They take on both negative and positive values. Their maximum values are limited by the physical properties of materials. The color difference ($\Delta E^*_{ab}$) between two color points. ($L^*_1$, $a^*_2$, $b^*_2$) and ($L^*_2$, $a^*_2$, $b_2$), is defined by the distance between the two points and computed by $$\Delta E^*_{ab} = [(L^*_2 - L^*_1)^2 + (a^*_2 - a^*_1)^2 + (b^*_2 - b^*_1)^2]^{1/2}$$

This color space can also be represented by cylindrical coordinates as shown in FIG. 2. The cylindrical coordinate system provides predictors of lightness. L*, chroma, C*, and hue, H*. The chroma correlates the colorfulness of an area and the hue correlates the types of colors such as red, green, blue, yellow, etc. The relationship among a*, b*, C* and H* is given by $$C^* = [a^*_2 + b^*_2]^{1/2}$$

$$H^* = \tan^{-1}(b^*/a^*)$$

$$a^* = C^* \cos(H^*)$$

$$b^* = C^* \sin(H^*)$$

Direct Yellow 132 is commercially available and has the structure which follows:

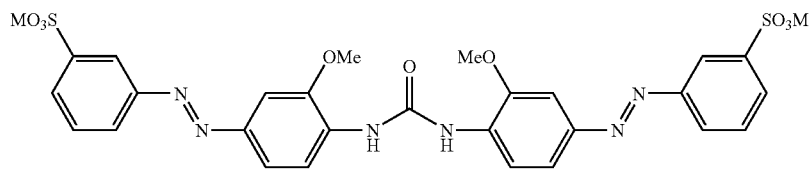

Where M is a cation such as Na⁺, K⁺, Li⁺, an optionally substituted ammonium ion or is H⁺.

Acid Yellow 17 is commercially available and has the structure which follows:

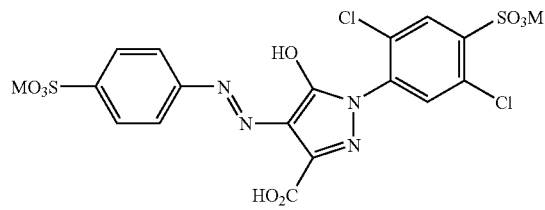

Where M is a cation such as Na⁺, K⁺, Li⁺, an optionally substituted ammonium ion or is H⁺.

The color data was collected on a Gretag-McBeth Spectolino/Spectrascan with 100% coverage patches printed on Kodak Premium Photo Paper. Permanence was evaluated by measuring the relative fade of 0.6 OD yellow block printed on Ilford Printasia Glossy Photo Paper after 504 hours of exposure to 43-kLux cool white fluorescent illumination.

All of the following examples employ the dyes having sodium counter ions. The amount of dye in acid form is reduced by the weight of the sodium ions.

In accordance with this invention a representative inkjet ink having 4% by weight Direct Yellow 132 (about 3.72% in acid form) and 1% by weight Acid Yellow 17 (about 0.93% in acid form) has a C* of 114.5, H* of 85.2 (where 90 is pure yellow), a* of 9.6, b* of 114.1, optical density of 2.0 and L* of 86.0.

Similarly, a representative inkjet ink having 4% by weight Direct Yellow 132 and 0.5% by weight Acid Yellow 17 (about 0.44% by weight in acid form) has C* of 112.0, H* of 84.7, a* of 10.0, b* of 111.5 and optical density of 1.9.

In comparison, Acid Yellow 23 alone in such an ink in the amount of 3% by weight had C* of 110.3, H* of 89.5, a* of 1.0, b* of 110.3 and optical density of 1.5, but a permanence of 86.6%. Thus, Acid Yellow 23 exhibits nearly ideal color, but has extremely poor lightfastness.

Acid Yellow 17 alone in such an ink, also in the amount of 3% by weight, had C* of 93.2, H* of 96.3, a* of −10.8, b* of 92.6, an optical density of 1.3 and a permanence of 27.9%. Thus, Acid Yellow 17 does not have the brilliant color of Acid Yellow 23, but has much better permanence.

Direct Yellow 132 alone in such an ink, but in amount of 3.4% by weight had C* of 106.7, H* of 86.9, a* of 5.9, b* of 106.3 optical density of 1.7, and permanence of 18%.

A combination of 4% by weight Direct Yellow 132 and 1% or 0.5% by weight Acid Yellow 23 did not show improved results at all comparable to those of 4% Direct Yellow 132 and 1 or 0.5% Acid Yellow 17 detailed above. (The closest such result found was 4% by weight non-commercial yellow dye and 0.5% by weight Acid Yellow 23, which had C* of 108.5 H* of 85.9, a* of 7.7, b* of 108.3 and optical density of 1.8.)

Thus, the combinations of about 4% Direct Yellow 132 in acid form and Acid Yellow 17 in acid form in the range of about 0.5% to 1 percent by weight Acid Yellow 17 has a C* at least almost 4% more than the foregoing closest ink with comparable mixture, but has a higher optical density and employs dyes of much better permanence than Acid Yellow 23.

A final attribute of a dye that is of critical importance to its utility in an inkjet application is its print performance. This characteristic is difficult to quantify, but general trends can be seen. Specifically, dyes with high aqueous stability tend to function well in an inkjet cartridge; conversely, dyes with low aqueous solubility tend to have performance problems. These problems often manifest themselves as poor maintenance, poor startup, or increased crusting. As the amount of a dye in the final ink increases, and the dye loading gets nearer to its solubility limit, more significant performance problems may be encountered. This is especially true with low solubility dyes. To overcome the performance issues associated with higher dye loading, it is often beneficial to choose dyes with high solubility, and to blend dyes. This second approach prevents any particular dye from approaching its solubility limit in the ink.

The aqueous solubility of Direct Yellow 132 is 13% and the aqueous solubility of Acid Yellow 17 is 19%. Some other yellow dyes have much better solubility such as Acid Yellow 23 which is 40%. The mixture of Direct Yellow 132 and Acid Yellow 17 enhances the solubility. The resulting typical ink will exhibit good maintenance and other performance.

Accordingly, this invention provides an inkjet ink of exceptional overall color characteristics and performance.

What is claimed is:

1. An aqueous inkjet ink comprising as coloring matter a mixture of about 4% by weight of said ink of Direct Yellow 132 in acid form and about 0.5% to about 1% by weight of said ink of Acid Yellow 17 in acid form, said ink having chroma of at least about 108.5, wherein the structural formula of said Direct Yellow 132 is the following:

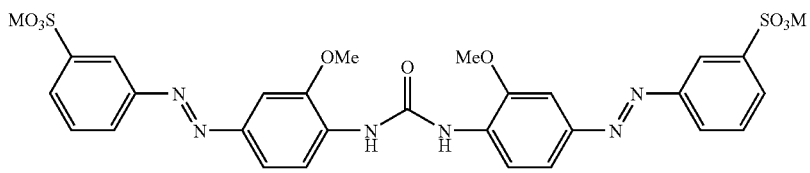

where M is a cation comprising Na⁺, K⁺, Li⁺, an optionally substituted ammonium ion or is H⁺, and wherein the structural formula of said Acid Yellow 17 is the following:

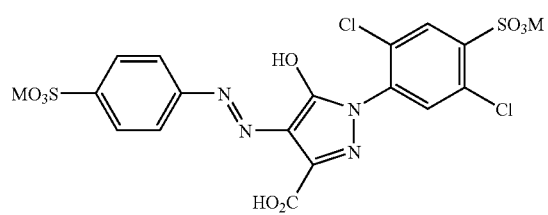

where M is a cation comprising Na⁺, K⁺, Li⁺, an optionally substituted ammonium ion or is H⁺.

2. The inkjet ink as in claim 1 in which said Acid Yellow 17 is in amount of about 1% by weight of said ink in acid form.

3. The inkjet ink as in claim 1 in which said ink comprises said Direct Yellow 132, said Acid Yellow 17, a humectant, a penetrant, and water.

4. The inkjet ink as in claim 2 in which said ink comprises said Direct Yellow 132, said Acid Yellow 17, a humectant, a penetrant, and water.

\* \* \* \* \*